United States Patent [19]

Schneider et al.

[11] 4,431,58(

[45] Feb. 14, 198

[54] METHOD FOR PURIFYING A NITRIC-ACID U/PU SOLUTION

[75] Inventors: Volker Schneider, Heusenstamm; Gerhard Margraf, Glauburg; Wolf-Günther Druckenbrodt, Rodenbach, all of Fed. Rep. of Germany

[73] Assignee: Alkem GmbH, Hanau, Fed. Rep. of Germany

[21] Appl. No.: 228,247

[22] Filed: Jan. 26, 1981

[30] Foreign Application Priority Data

Jan. 29, 1980 [DE] Fed. Rep. of Germany ....... 3003088

[51] Int. Cl.³ ............................................. C09K 11/04

[52] U.S. Cl. .................................. 252/631; 210/670; 210/682; 210/688; 252/627; 423/7

[58] Field of Search .................... 252/627, 631; 423/7; 210/688, 670, 682

[56] References Cited

U.S. PATENT DOCUMENTS

| | | | |
|---|---|---|---|
| 2,554,476 | 5/1951 | Werner | 252/631 ) |
| 2,875,024 | 2/1959 | Tompkins | 423/7 ) |
| 3,158,577 | 11/1964 | Bray et al. | 252/63 |
| 3,880,980 | 4/1975 | Wamser | 423/' |

FOREIGN PATENT DOCUMENTS

| | | | |
|---|---|---|---|
| 526260 | 6/1956 | Canada | 252/63 |

*Primary Examiner*—Herbert B. Guynn
*Attorney, Agent, or Firm*—Herbert L. Lerner; Laurenc( A. Greenberg

[57] ABSTRACT

Purifying a nitric acid solution containing U/Pu ion and contaminated by metal impurities by (a) oxidizing the U/Pu ions of the solution to the hexa valent form, (b) conducting the solution after oxidation through ; cation exchanger column in which the impurities especially americium, are retained, (c) flushing the cation exchanger column to remov( impurities therefrom, which may be taken to wast( processing or utilization plant.

11 Claims, 1 Drawing Figure

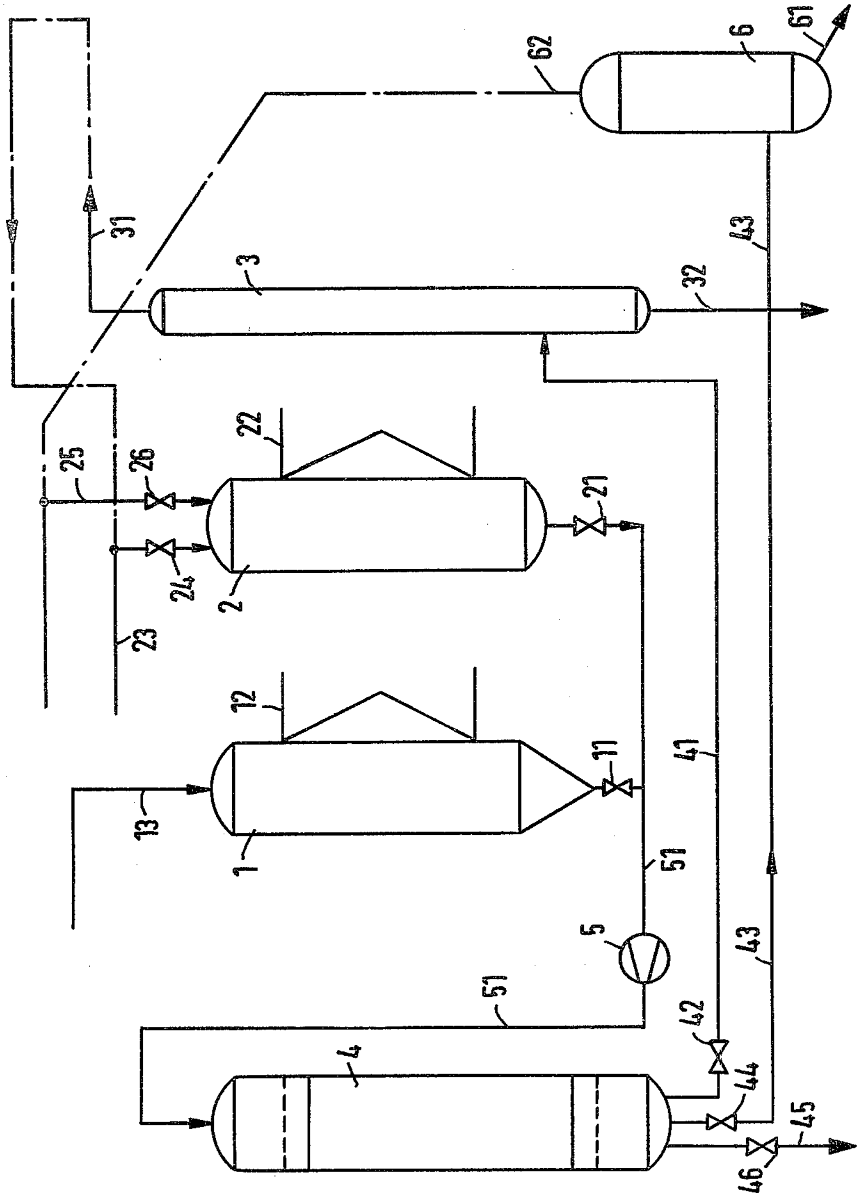
1
2
3
4
5
6
11
12
13
21
22
23
24
25
26
31
32
41
42
43
44
45
46
51
61
62

METHOD FOR PURIFYING A NITRIC-ACID U/PU SOLUTION

BACKGROUND OF THE INVENTION

1. Field of the Invention

The present invention relates to a method for purifying a nitric-acid U/Pu solution of contaminants.

2. Description of the Prior Art

Such nitric acid solutions are produced, for instance, in wet scrap recycling in a fuel assembly factory. They must be recycled into the conversion process, i.e. into the process for manufacturing nuclear fuels and fuel pellets from $UO_2$ and $PuO_2$, respectively. The impurities contained therein, which are due, for instance, to the material of the reaction vessels as well as of the piping and are therefore predominantly of a metallic nature, must first be removed. The normal impurities consist of iron and chromium; in the case of plutonium-containing nuclear fuels, americium is added, a decay product of plutonium which is produced during the storage of plutonium-containing nuclear fuels but must not be incorporated, as a neutron poison, into nuclear fuel pellets which are to be freshly produced.

In extended storage of $PuO_2$-powder, it is likewise necessary to separate the americium that has built up. This can be done by the same method.

According to the present technique, for instance, the known Purex process, impurities are removed from uranium/plutonium solutions by extraction methods. Normally, a separation into a uranium solution and a plutonium solution takes place at the same time. With the extraction method, however, the use of organic, flammable solvents is necessary, which should be avoided as far as possible in the processing of plutonium in glove boxes; the fire hazard must be minimized.

Ion exchangers from processes for the purification of plutonium have also been used in many applications. These are mostly anion exchangers which are charged with strong nitric-acid solutions.

The plutonium (IV) is present in that case as a nitrato complex and remains in the ion exchanger column, while the impurities such as americium, uranium and heavy metals pass through the column. Thus, a separation of the uranium and plutonium comes about and the plutonium must be elutriated again with large amounts of diluted acid.

If cation exchangers are used, the plutonium (III) with all other metal cations is retained in the exchanger columns and uranium (VI) passes through the column as anion complex. Thus, a separation of uranium and plutonium again comes about, which latter is further loaded with all metallic impurities, as mentioned at the outset. Here, too, the plutonium must be elutriated with large amounts of diluted acid.

This state of the art thus requires in any case a rather large amount of equipment, especially since the impurities still must be separated from the uranium or plutonium, respectively.

Since uranium as well as plutonium are used in their oxidic form as nuclear fuel, especially also as mixed oxides, the problem arose to remove from their solutions only the impurities and to take them to a waste processing system and to recycle the so purified solution into the conversion process.

SUMMARY OF THE INVENTION

With the foregoing and other objects in view, there is provided in accordance with the invention a method for purifying a nitric acid solution containing U/Pu ions and contaminated by metal impurities which comprises oxidizing the U/Pu ions in the nitric acid solution to the hexavalent form, passing the nitric acid solution containing the U/Pu ions after oxidation in contact with a cation exchanger to remove the metal impurities from the nitric acid solution, and recovering the purified nitric acid solution.

In accordance with the invention, there is provided a method for the separation of americium from Pu-containing nuclear fuel powders or pellets which have been stored a long time and in which americium has built-up, which comprises converting the nuclear fuel to a nitric acid solution containing U-ions and contaminated by americium, oxidizing the U-ions in the nitric acid solution to the hexavalent form, passing the nitric acid solution containing the U-ions after oxidation in contact with a cation exchanger to remove the americium from the nitric acid solution, and recovering the purified nitric acid solution containing Pu substantially free of americium.

Other features which are considered as characteristic for the invention are set forth in the appended claims.

Although the invention is illustrated and described herein as embodied in a method for purifying a nitric-acid U/Pu solution, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings in which is diagrammatically illustrated apparatus for carrying out the invention including an oxidation vessel for effecting oxidation of the U/Pu ions, an ion exchanger column for removing metal contaminants and evaporators for recovery of flushing liquid and concentration of impurities.

DETAILED DESCRIPTION OF THE INVENTION

In accordance with the invention, the U/Pu ions of the starting solution are oxidized up to the hexavalent form. The solution is conducted through a cation exchanger column in which the impurities, especially americium, are retained. The impurities are taken to the waste processing or utilization plant through subsequent flushing of this column.

This method is of particular interest in plutonium processing in a fuel assembly factory. If modern coprecipitation methods are used, soluble $(U/Pu)O_2$ powders are produced. If, during excessively long interim storage of plutonium, an americium content has built up in the material which must be separated prior to further processing, these powders can be dissolved and purified according to the method of the invention and processed further. By the same method, manufacturing scrap which has been accumulated over an extended period of time and may be additionally contaminated, can be dissolved and purified.

To illustrate this method in further detail, reference is made to the flow diagram shown in the drawing, and ıe latter will be explained in greater detail with the aid f an example. To demonstrate this method better: im-urities were artificially added to a nitric-acid U/Pu ɔlution which then had the following composition:

| | | | | | |
|---|---|---|---|---|---|
| U | 60 g/l | Pu | 20 g/l | $HNO_3$ | 7 m (molar) |
| Am | 2 g/l | Fe | 6 g/l | Cr | 4 g/l |

This solution is now admitted through line 13 into the xidation vessel 1, which is provided with a heating evice 12. By heating to 130° to 150° C., this solution is xidized-up during a time of about 30 minutes and the itric-acid concentration is set. The following listing hows this nitric acid concentration as well as the va-ence stages attained of the ions contained therein.

| | | | |
|---|---|---|---|
| $UO_2^{2+}$ | $PuO_2^{2+}$ | $HNO_3$ | ~ 0.7 m |
| $Am^{3+}$ | $Fe^{3+}$ | $Cr^{3+}$ | |

This oxidized solution is fed through valve 11 and the ne 51 to the ion exchanger column 4 by means of a ump 5. The cation exchanger resin contained therein highly acid cation exchanger with $SO_3$— as functional roups) is laid out so that predominantly the trivalent eavy metal ions are adsorbed, but not the uranyl and lutonyl ions. The solution discharged from ion ex-hange column 4, the valve 46 and the line 45 then has he following composition:

| | | | | | |
|---|---|---|---|---|---|
| U | 51-53 g/l | Pu | 17-17.5 g/l | | |
| Am | 0.05-0.07 g/l | Fe | 0.8-1 g/l | Cr | 0.6-0.7 g/l |

Comparison with the starting composition shows that ssentially americium, iron and chromium and only mall amounts of uranium and plutonium remain in the olumn 4.

The discharged U/Pu solution from column 4 may irst be returned directly to the conversion plant. For he further recovery of the uranium and plutonium emaining in the column 4, the latter is elutriated in a argeted manner. To this end, the ion exchanger column · is flushed with 0.5 to 1-molar nitric acid at a medium emperature. This flushing liquid may be introduced hrough line 23 and valve 24 into flushing liquid tank 2 quipped with heater 22 for heating the contents to a nedium temperature, i.e. a temperature below 100° C., ıreferably between 30°-70° C. The flushing liquid flows rom tank 2 through valve 22, line 51 and forced by ıump 5 to the top of column 4. The flushing liquid ıroduced thereby contains

| | | | | | |
|---|---|---|---|---|---|
| U | 5-6 g/l | Pu | 1.5-2 g/l | | |
| Am | 0.08-0.05 g/l | Fe | 0.9-0.5 g/l | Cr | 0.6-0.4 g/l |

The flushing liquid, after passage through the ion ːxchanger 4, passes through the valve 42 and the line 41 o the evaporator 3. The heating device of the latter is ıot specifically shown for the sake of clarity, since ːquipment of this type is known. In this evaporator, the lushing solution is concentrated by evaporation and the ʼapors as distillate flow through line 31 and valve 24 to he supply tank for further use as flushing liquid. As nentioned, the flushing liquid from tank 2 flows via the ʼalve 21, line 51 and pump 5 in the flushing process of he ion exchanger column 4. With the evaporation process step, further concentration of the U/Pu ions in the remaining solution is obtained; the latter is then returned to the conversion plant via the line 32.

After this operation, only the impurities still remain in the ion exchanger column. These are then elutriated with 1 to 3-molar nitric acid, which was prepared in the tank 2 (although another tank may be employed) and was charged through the line 25 and the valve 26. The eluate from column 4 is fed to an evaporator 6 via the valve 44 and the line 43; the distillate produced from evaporator 6 is returned to the supply tank 2 via line 62, line 25, and valve 26. The concentrated solution discharged from evaporator 6 through the line 61 is fed either to the known americium conversion or to the known waste processor. After rinsing with approximately 0.5-molar nitric acid, the ion exchanger 4 is available for another purification cycle.

By a multiple arrangement of the vessels 1 to 6, this originally intermittent method can be made quasi-continuous. The equipment is within the general state of the art, so that no difficulties are encountered with this simple method from this direction. The simple design of the apparatus required also makes it possible to install it in glove boxes such as are customary in plutonium-processing operations.

The equipment required for monitoring the method, such as temperature sensors, acidity measuring devices etc., as well as their control-engineeringwise interconnection is not shown for the sake of clarity: this technology belongs, if the process cycle described is known, to the knowledge that is taken for granted of an expert active in this field.

In conclusion, the advantages connected with this method will be summarized briefly.

1. The design capacity of the ion exchanger columns 4 need not be laid out for the amount of uranium and plutonium, but largely only for the amount of impurities expected.

2. Uranium and plutonium which are already admixed in the starting materials are not separated and can be processed further together. 3. Since the major part of the uranium and plutonium passes through the ion exchanger column 4 without being adsorbed, the amount of elutriation acid which is subsequently concentrated, can be kept small. This means considerable savings in evaporator capacity and therefore, also in energy costs.

4. Since a cation exchanger resin of the mentioned kind is used, the latter cannot be nitrated and is, therefore, very safe to handle.

5. The exchanger resin is radiation-resistant and can be used for a large number, for instance, more than 100 cycles without loss of capacity.

6. The special high adsorptivity of the cation exchanger resin for americium facilitates the later management of the process for the americium conversion, if this is desired.

7. The ultimate storage of the elutriated impurities, which are accumulated in concentrated form, is within the state of the art.

We claim:

1. Method for treating a nitric acid solution containing uranium and plutonium ions and contaminated by metal impurities to effect retention of a major part of both the uranium and plutonium in the solution while effecting substantial removal of the metal impurities, which comprises subjecting said nitric-acid solution with at least one of the uranium and plutonium in the solution below hexavalent form contaminated by heavy metal impurities to oxidation to oxidize the plutonium and uranium below hexavalent form to the hexavalent form, passing the nitric-acid solution containing the uranium and plutonium ions after oxidation in contact with a cation exchanger to effect substantial removal of the heavy metal impurities from the nitric-acid solution while retaining a major part of both the uranium and plutonium in the solution, and recovering the purified nitric-acid solution.

2. Method according to claim 1, wherein said oxidation is effected by maintaining said nitric acid solution at a temperature of about 130°–150° C. for a period of about 30 minutes.

3. Method according to claim 1, wherein said cation exchanger is flushed with a nitric acid solution to remove at least part of metal impurities from the cation exchanger and also small amounts of uranium and plutonium retained on the cation exchanger.

4. Method according to claim 3, wherein flushing liquid from said cation exchanger is subjected to evaporation to produce a distillate which is returned for further use as a flushing liquid, and a concentrate of uranium and plutonium ions for recovery or disposal.

5. Method according to claim 4, wherein the exchanger is subjected to a second flushing with nitric acid to further remove metal impurities and wherein flushing liquid from the cation exchanger is subjected to evaporation to produce a distillate and a concentrate.

6. Method according to claim 5, wherein one of the metallic impurities in the nitric acid solution is americium, and wherein the first nitric acid flushing solution is inadequate in concentration to substantially remove said americium from the cation exchanger, and wherein said second nitric acid flushing solution is of a concentration to substantially remove said americium from the cation exchanger, and wherein said concentrate resulting from said evaporation of said second flushing liquid contains the americium removed from the cation exchanger, said concentrate directed to recovery of americium or disposal.

7. Method for the separation of americium from plutonium-containing nuclear fuel powders or pellets which have been stored a long time and in which americium has built-up, which comprises converting the nuclear fuel to a nitric acid solution containing uranium and plutonium ions and contaminated by americium, oxidizing the uranium and plutonium ions in the nitric acid solution to the hexavalent form, passing the nitric acid solution containing the uranium and plutonium ions after oxidation in contact with a cation exchanger to remove the americium from the nitric acid solution, and recovering the purified nitric acid solution containing plutonium substantially free of americium.

8. Method for treating a nitric acid solution containing uranium and plutonium ions and contaminated by metal impurities to effect retention of both a major part of the uranium and plutonium in the solution while effecting substantial removal of the metal impurities, which comprises subjecting said nitric acid solution with at least one of the uranium and plutonium in the solution below hexavalent form contaminated by metal impurities selected from the group consisting of iron, chromium and americium to oxidation to oxidize the plutonium and uranium below hexavalent form to the hexavalent form, passing the nitric-acid solution containing the uranium and plutonium ions after oxidation in contact with a cation exchanger to effect substantial removal of said heavy metal impurities from the nitric acid solution while retaining a major part of both the uranium and plutonium in the solution, and recovering the purified nitric acid solution.

9. Method for treating a nitric acid solution containing uranium and plutonium ions and contaminated by iron to effect retention of a major part of both the uranium and plutonium in the solution while effecting substantial removal of the iron which comprises subjecting said nitric-acid solution with at least one of the uranium and plutonium in the solution below hexavalent form contaminated by iron to oxidation to oxidize the plutonium and uranium below hexavalent form to the hexavalent form, passing the nitric-acid solution containing the uranium and plutonium ions after oxidation in contact with a cation exchanger to effect substantial removal of the iron from the nitric-acid solution while retaining a major part of both the uranium and plutonium in the solution, and recovering the purified nitric acid solution.

10. Method for treating a nitric-acid solution containing uranium and plutonium ions and contaminated by chromium to effect retention of a major part of both the uranium and plutonium in the solution while effecting substantial removal of the chromium which comprises subjecting said nitric-acid solution with at least one of the uranium and plutonium in the solution below hexavalent form contaminated by chromium to oxidation to oxidize the plutonium and uranium below hexavalent form to the hexavalent form, passing the nitric-acid solution containing the uranium and plutonium ions after oxidation in contact with a cation exchanger to effect substantial removal of the chromium from the nitric-acid solution while retaining a major part of both the uranium and plutonium in the solution, and recovering the purified nitric-acid solution.

11. Method for treating a nitric-acid solution containing uranium and plutonium ions and contaminated by americium to effect retention of a major part of both the uranium and plutonium in the solution while effecting substantial removal of the americium which comprises subjecting said nitric-acid solution with at least one of the uranium and plutonium in the solution with at least one of the uranium and plutonium in the solution below hexavalent form contaminated by americium to oxidation to oxidize the plutonium and uranium below hexavalent form to the hexavalent form, passing the nitric acid solution containing the uranium and plutonium ions afer oxidation in contact with a cation exchanger to effect substantial removal of the americium from the nitric-acid solution while retaining a major part of both the uranium and plutonium in the solution, and recovering the purified nitric-acid solution.

* * * * *